(12) United States Patent
Weekamp

(10) Patent No.: US 9,732,913 B2
(45) Date of Patent: Aug. 15, 2017

(54) FILAMENT FOR LIGHTING DEVICE

(71) Applicant: PHILIPS LIGHTING HOLDING B.V., Eindhoven (NL)

(72) Inventor: Johannes Wilhelmus Weekamp, Beek en Donk (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/901,897

(22) PCT Filed: Mar. 5, 2015

(86) PCT No.: PCT/EP2015/054554
§ 371 (c)(1),
(2) Date: Dec. 29, 2015

(87) PCT Pub. No.: WO2015/135817
PCT Pub. Date: Sep. 17, 2015

(65) Prior Publication Data
US 2016/0369952 A1 Dec. 22, 2016

(30) Foreign Application Priority Data
Mar. 13, 2014 (EP) .................................. 14159493

(51) Int. Cl.
F21K 9/237 (2016.01)
F21V 8/00 (2006.01)
(Continued)

(52) U.S. Cl.
CPC .............. F21K 9/237 (2016.08); F21K 9/232 (2016.08); F21K 9/235 (2016.08); F21K 9/64 (2016.08);
(Continued)

(58) Field of Classification Search
CPC ...................................................... H01L 33/54
(Continued)

(56) References Cited

U.S. PATENT DOCUMENTS

2004/0007980 A1* 1/2004 Shibata ..................... F21K 9/27
313/634
2004/0007981 A1 1/2004 Shibata
(Continued)

FOREIGN PATENT DOCUMENTS

CN 101968181 A 2/2011
CN 102109115 A 6/2011
(Continued)

OTHER PUBLICATIONS

John Lewis Calex 6.5w BC Energy Saving LED Filament Classic Bulb, Clear, http://www.johnlewis.com/calex-6-5w-bc-energy-saving-led-filament- . . . , last visited on Feb. 1, 2014 (2 pages).
(Continued)

Primary Examiner — Anne Hines

(57) ABSTRACT

The present invention relates to a filament (100) comprising a light transmissive tubular member (110), a light emitting assembly (106) arranged within the tubular member (110), a wavelength converter (112) arranged at a surface of the tubular member (110) and configured to convert light from a first wavelength range to a second wavelength range. The light emitting assembly (106) comprises a plurality of solid state light sources (102) and interconnecting elements (104) being arranged in an alternating manner to form a string (106) of connected solid state light sources (102) and interconnecting elements (104). The interconnecting elements are portions of a lead frame (104) and at least a part of the plurality of solid state light sources (102) are arranged on opposite sides of the lead frame (104) in an alternating manner. The inventive filament (100) is simple, easy and (Continued)

cheap to manufacture, thus providing a good replacement and approximation for an incandescent wire.

14 Claims, 4 Drawing Sheets

(51) Int. Cl.
  F21K 9/232 (2016.01)
  F21K 9/64 (2016.01)
  F21K 9/235 (2016.01)
  F21K 9/90 (2016.01)
  F21V 19/00 (2006.01)
  F21V 31/00 (2006.01)
  F21V 9/16 (2006.01)
  F21Y 103/10 (2016.01)
  F21Y 115/10 (2016.01)

(52) U.S. Cl.
  CPC ............ *F21K 9/90* (2013.01); *F21V 19/006* (2013.01); *F21V 31/005* (2013.01); *G02B 6/0003* (2013.01); *G02B 6/0096* (2013.01); *F21V 9/16* (2013.01); *F21Y 2103/10* (2016.08); *F21Y 2115/10* (2016.08)

(58) Field of Classification Search
  USPC .................................. 313/22, 46, 502–512
  See application file for complete search history.

(56) References Cited

U.S. PATENT DOCUMENTS

| | | | |
|---|---|---|---|
| 2004/0008525 A1 | 1/2004 | Shibata | |
| 2005/0242711 A1* | 11/2005 | Bloomfield | F21K 9/00 313/502 |
| 2009/0140271 A1* | 6/2009 | Sah | F21K 9/00 257/88 |
| 2010/0123143 A1 | 5/2010 | Chang | |
| 2010/0181582 A1* | 7/2010 | Li | H01L 33/44 257/91 |
| 2012/0162965 A1 | 6/2012 | Takeuchi et al. | |
| 2013/0069089 A1 | 3/2013 | Hussell et al. | |
| 2013/0194797 A1 | 8/2013 | Jackson | |
| 2015/0198289 A1* | 7/2015 | Hsu | F21S 4/26 362/225 |

FOREIGN PATENT DOCUMENTS

| | | |
|---|---|---|
| CN | 202040591 U | 11/2011 |
| CN | 202834811 U | 3/2013 |
| CN | 202834823 U | 3/2013 |
| CN | 202834830 U | 3/2013 |
| CN | 103423644 A | 12/2013 |
| EP | 2597354 A1 | 5/2013 |
| JP | 3075996 U | 7/1991 |
| JP | 2010097763 A | 4/2010 |
| JP | 2013127988 A | 6/2013 |
| JP | 2013179050 A | 9/2013 |
| WO | 2012085736 A1 | 6/2012 |
| WO | 2013116623 A1 | 8/2013 |
| WO | 2013121481 A1 | 8/2013 |
| WO | 2014033996 A1 | 3/2014 |

OTHER PUBLICATIONS

Ogasawara, Yousuke, "Ushio Lighting Releases Light Bulbs with LED Filaments," Nikkei Electronics, Tech-On!, http://techon.nikkeibp.co.jp/english/NEWS_EN/20090106/163635 . . . ; last visited on Feb. 1, 2014 (2 pages).

U-LED Filament LED Lamps, Ushio, Lighting Edge Technologies, http://www.ushio.com/products/generallighting/led-uled.htm, last visited on Feb. 1, 2014 (2 pages).

* cited by examiner

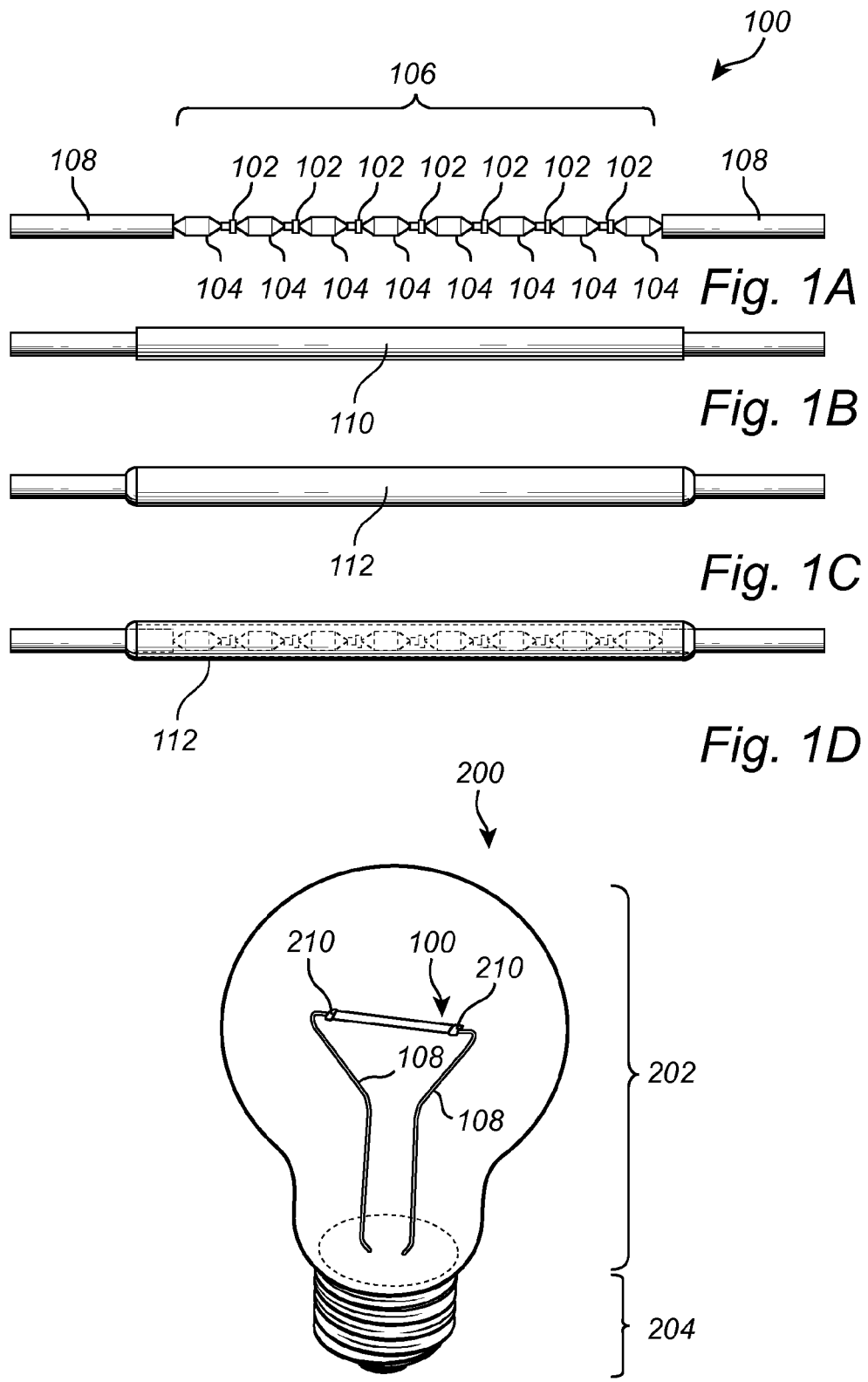

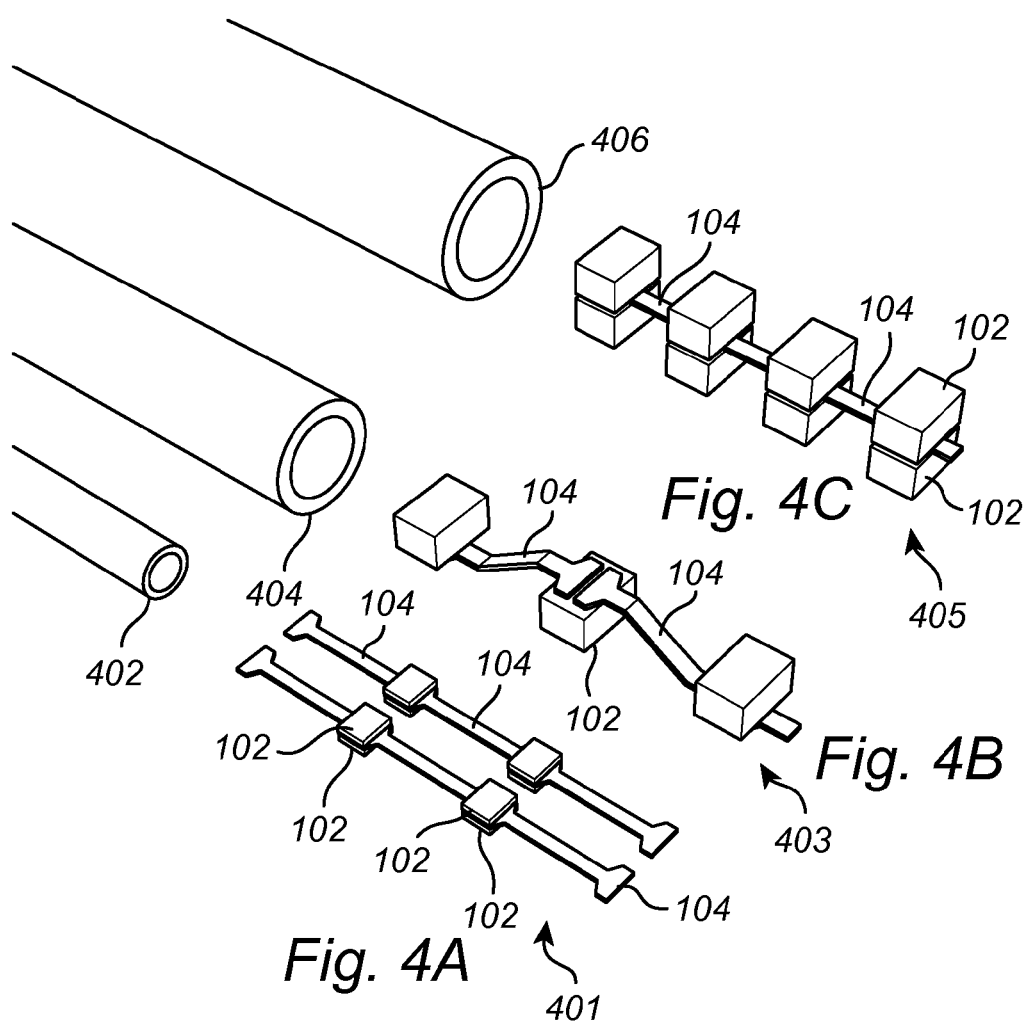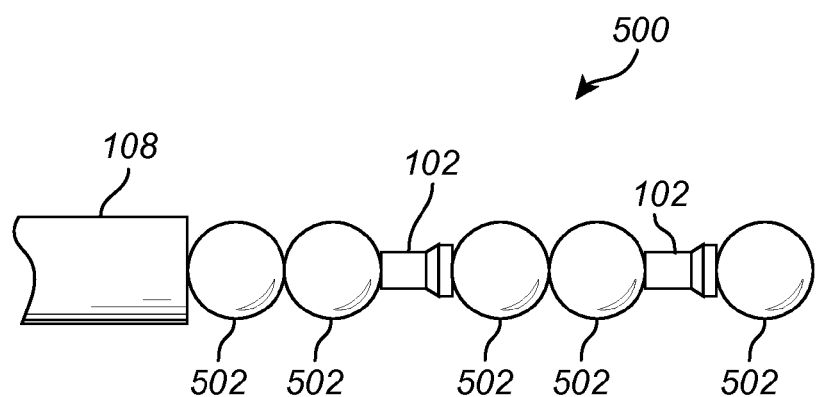

FILAMENT FOR LIGHTING DEVICE

CROSS-REFERENCE TO PRIOR APPLICATIONS

This application is the U.S. National Phase application under 35 U.S.C. §371 of International Application No. PCT/EP2015/054554, filed on Mar. 5, 2015, which claims the benefit of European Patent Application No. EP 14159493.7, filed on Mar. 13, 2014. These applications are hereby incorporated by reference herein.

FIELD OF THE INVENTION

The invention relates to a filament and a method of manufacturing such a filament. Furthermore, the invention also relates to a lighting device and a method of manufacturing such a lighting device.

BACKGROUND OF THE INVENTION

New and more energy efficient illumination devices are being developed every day. They are often based on common technologies utilizing solid state light sources such as Light Emitting Diodes (LEDs). Most, if not all, commercially available solid state light sources having a high efficiency emit light of undesired wavelengths e.g. UV, blue, violet etc. Hence, there is often a wavelength converter present which converts light of a shorter wavelength, into light of a longer wavelength in a highly transparent luminescent material. The wavelength converter then produces light of a pleasing aesthetic wavelength similar to e.g. natural white light.

For a new kind of energy efficient lighting device to replace the current regime of incandescent light bulbs it would be beneficial if such a device would work as a retrofit of the incandescent bulb. A retrofit could for example have a similar outside form factor, which is commercially available today, where solid state light sources are mounted within some kind of bulb shaped cover structure, thus providing the look, i.e. aesthetic, of an incandescent bulb. However, just the aesthetic characteristic of an incandescent bulb may not entirely please all customers. The light distribution from a retrofit bulb should also be uniform. The currently available replacement light bulbs most often comprise solid state light sources which are arranged on a flat circuit board and placed in the bulb. Thus, the light distribution, i.e. luminance, of these bulbs is not as uniform as the light distribution from an ordinary incandescent bulb.

US patent application 2004/0008525 tries to remedy the problem of an uneven light distribution by introducing a LED lamp chain on which a plurality of light emitting diodes are arranged and which is placed in a bulb, and wherein fluorescent material may be included in the bulb material. However, the solution may not provide a uniform light distribution of desirable wavelengths, and the fluorescent material may experience an uneven luminance and the light from the bulb may be perceived as spotty.

US2004/0007980A1 discloses a LED chain body formed by connecting a plurality of LED via flexible members and which is inserted into a transparent or translucent tube. WO2012/085736A1 discloses a light guide in the form of a continuous optical element in which a string of a plurality of LEDs is arranged and in which the LEDs may be mounted on a small flexible PCB with the continuous optical element on top of it or encapsulating it.

Hence, there is a need for a lighting device which replaces the incandescent bulb, advantageously such a lighting device is a retrofit of the current design and thus able to fit into current lighting fixtures in use today. Further, such a device is desirably simple, cheap, and configured such that current mass-manufacturing techniques are easily applied to manufacture it.

SUMMARY

With regards to the above-mentioned desired properties of a lighting device, it is a general object of the present invention to provide a lighting device which is simple, cheap, easy to manufacture and/or mass manufacturable.

According to a first aspect of the invention, these and other objectives are achieved through a filament for a lighting device, which filament comprises a light transmissive tubular member, wherein a light emitting assembly is arranged within the tubular member and a wavelength converter is arranged at a surface of the tubular member and configured to convert light from a first wavelength range to a second wavelength range. The light emitting assembly comprises a plurality of solids state light sources and interconnecting elements which are arranged in an alternating manner to form a string of connected solid state light sources and interconnecting elements. The interconnecting elements are portions of a leadframe, wherein at least a part of the plurality of solid state light sources are arranged on opposite sides of the lead frame in an alternating manner.

The purpose of the filament is to provide lighting, and the solid state light sources, which may be light emitting diodes (LEDs) or other solid state light sources, are the main components providing this function. Light emitting diodes should be understood as LED dies, LED subassemblies or packaged LED's. The wavelength converter is configured to convert light from a first wavelength range to a second wavelength range. It should be noted that this conversion is usually from a shorter wavelength to a longer wavelength. Furthermore, the wavelength converter is typically provided in the form of a luminescent structure comprising phosphor.

The interconnecting elements are understood to be electrically conductive in order to allow the light sources to emit light. Further, the interconnecting elements provide a distance between each light source in order to emit an even luminance along the length of the filament.

The light transmissive tubular member will, in use, act as a light guide and thereby provide a uniform light distribution from the tubular member. The light sources may thus be driven at a high power while the temperature load on the wavelength converter is uniform as a result of the light being guided by the light transmissive tubular member to the wavelength converter. Thereby, the light emitted from the filament will have a uniform luminance and the perceived spottiness of the filament will be reduced. The light transmissive tubular member is understood to be hollow, and comprises an opening at each end.

A "filament" here generally should be construed as a threadlike or elongated object for a light emitting device that emits light when electricity passes through it.

The present invention is based on the realization that by providing a novel filament which is easy to assemble and which is aesthetically similar and therefore perceived as a filament of an incandescent bulb, an energy efficient replacement or retrofit for the incandescent bulb can be produced. Thus, the filament allows retrofit lighting devices at a low cost which is also aesthetically pleasing and appreciated by customers who are used to incandescent bulbs. By arranging a part of the plurality of solid state light sources on opposite sides of the lead frame in an alternating manner, energy may be conserved during use while still providing an even, although lower luminance.

In one embodiment the light transmissive tubular member may be formed by glass. Forming the light transmissive tubular member in glass will advantageously allow the use of common manufacturing techniques relating to glass. Furthermore the optical properties of glass are well known, thus providing for the possibility to tune the amount of light being guided and the amount of light being directly transmitted through the hollow light transmissive tubular member i.e. the amount of reflected or refracted light in the interfaces between the hollow light transmissive tubular member and other components of the filament.

In another embodiment the hollow light transmissive tubular member may be formed by silicone. Forming the hollow light transmissive tubular member from silicone makes the filament easy to handle, and as silicone is a soft material it allows the filament to be bendable. A bendable filament allows different shapes and designs which either increase the amount of light in a certain direction i.e. provides a directionality of the light, or designs which are just aesthetically pleasing are possible. Such designs may then also be realized after manufacturing by bending the filament where the tubular member is formed using silicone.

According to various embodiments of the present invention, the light transmissive hollow tubular member may have an outer diameter of less than 3.3 mm, preferably less than 2.4 mm and most preferably less than 1.5 mm. A sufficiently small light transmissive tubular member will further enhance the present filament's aesthetic look and similarity to a filament of an incandescent bulb. Furthermore, a smaller light transmissive tubular member will require less material and thus save costs and/or energy during manufacturing. Even further, parallel processes for assembling a filament according to the present invention may become more efficient as the light transmissive tubular member becomes smaller, i.e. in that more filaments may be produced in parallel.

In one embodiment, the wavelength converter may be placed on the outside of the tubular member.

In one embodiment the filament may be filled with silicone. The silicone filling the space within the tubular member not occupied by the interconnecting elements or the light sources will improve the light extraction. The silicone may be in a liquid state, or cured to a certain viscosity or flexibility.

In another embodiment the filament may further comprise a first sealing cap arranged at one end of the tubular member and a second sealing cap arranged at the opposite end of the tubular member for sealing the inside of the tubular member, wherein the wavelength converter is arranged on the inside of the sealed light transmissive tubular member. The sealing caps will seal and protect the inside of the light transmissive hollow tubular member and ensure that no debris is present and/or that no contamination of the light sources and/or interconnecting elements occurs. The sealing caps will also advantageously reflect the light which would otherwise be emitted through the openings at the end of the light transmissive hollow tubular member. The light that would normally escape may thus be reflected and guided through the light transmissive hollow tubular member and then wavelength converted into a desired wavelength by the wavelength converter. In this embodiment the wavelength converter may be an organic phosphor. The sealing caps also ensure that the organic phosphor is not exposed to the outside of the filament.

The interconnecting elements may be chosen from the group consisting of: pressure contacts, soldering balls, glue and portions of a lead frame and combinations thereof. All of the abovementioned interconnecting elements provide advantages either in use or in manufacturing the filament. For example, the pressure contacts will enable an easy assembly of the device and also provide a secure contact even when the filament is bent, e.g. in the case of the light transmissive hollow tubular member being formed in silicone or using a bending glass tube as the hollow light transmissive tubular member. The soldering balls, will allow for a quick fixation by heating the entire filament after arranging an alternating string of solid state light sources and soldering balls. The soldering balls may be solder balls having a plastic core in order to further provide the possibility to use them together with pressure contacts, or as pressure contacts themselves. In order to apply pressure to the pressure contact or solder balls, an external spring may be used or an additional mechanical spring may be placed in the filament. Alternatively, the coefficient of thermal expansion (CTE) of the tubular member and CTE of the light emitting assembly are configured such that they, in use, will provide a pressure to the interconnecting elements. A lead frame and/or glue will provide the filament with a stiffness and/or heat conduction which will enable the filament to have a longer lifetime due to a reduced operating temperature. Further, if no solder is used the operation temperature of the light sources will ordinarily be determined or limited only by the junction temperature.

According to an embodiment, the solid state light sources are arranged in pairs facing away from each other on the portions of the lead frame. By providing at least two light sources on opposite sides of a lead frame the luminance from the filament in those opposite directions will be more uniform. The appearance of the filament is thus improved.

According to a second aspect of the present invention, a lighting device may comprise a lighting device housing which comprises a bulb portion and a base portion, the base portion being electrically connectable to an electrical grid. A filament according to the first aspect is electrically and mechanically connected to the base portion by a connecting structure within the bulb portion, and the lighting device housing is sealed. Arranging the filament within a lighting device housing in the shape of a bulb provides a retrofit to the incandescent bulb which approximates aesthetics and luminance i.e. the look and feel of an incandescent bulb due to the similarity between the filament and an incandescent filament. It should be noted that being electrically connectable to the electrical grid means that the base portion may be shaped as an ordinary Edison screw base or a bayonet fitting or any other suitable shape to be able to be fixated in lighting fixtures that are in use today. Furthermore, by being electrically connectable the base portion may also comprise electronics for converting the electricity from the electrical grid to a form suitable to drive the light source, i.e. driver electronics. The support structure connecting the base portion and the filament should be understood to also connect the electricity from the base portion to the filament. Hence, the supporting structure is an electrically conducting support structure. The lighting device is sealed in order to protect the filament and inside of the lighting device from contamination or the like. The bulb portion is light transmissive in order to increase the amount of light being provided from the lighting device.

According to an embodiment of the present invention, the bulb portion of the lighting device housing may be filled with helium. Helium has a thermal conductivity which is higher than that of air. By conducting the heat away from the filament, helium will provide a lower temperature for the filament and thus increase the lifetime of the light sources. Furthermore, the light sources may be kept at a temperature that provides a long lifetime while still being driven with a high power output.

According to a third aspect of the present invention, the objectives are also achieved by a method for manufacturing a filament. The method comprises the steps of providing interconnecting elements and solid state light sources, arranging said interconnecting elements and solid state light sources in an alternating manner forming a string. The method further comprises placing the string inside a tubular member and arranging a wavelength converter at a surface of said hollow tubular member. By forming a string of interconnecting elements and solid state light sources in an alternating manner and placing the string inside a tube and arranging a wavelength converter on a surface of the tube, a suitable replacement for the incandescent filament of the incandescent bulb is provided. Furthermore, as the filament is easy to manufacture it will also be cheap and result in a cost and energy efficient filament. The step of providing interconnecting elements and light sources comprises laser cutting a lead frame, applying tacky flux to the lead frame and arranging solid state light sources on the lead frame, re-flow soldering the lead frame and light sources in order to fix the solid state light sources to the lead frame and separating the lead frame from any support or adjacent lea frame(s). Using a thin lead frame, for example of thickness about 100 micrometers, allows for laser cutting the lead frame and producing a large number of filaments simultaneously in a parallel manner. Suitable solder types for reflow the soldering may be either SAC or Au/Sn solder. Au/Sn solder has a melting point which is higher than SAC solders.

Further effects and features of this third aspect of the present invention are largely analogous to those described above in connection with the first and second aspects of the invention.

In an example the step of providing interconnecting elements and light sources may comprise providing a first shaking mould which comprises holes configured to receive light sources, and providing a second shaking mould which comprises holes configured to receive interconnecting elements. The step may further comprise feeding solid state light sources and interconnecting elements to the shaking moulds. Placing the string inside a light transmissive tubular member may comprise, in an alternating manner, to arrange the first and the second shaking mould at a matrix holding tubular members to feed the solid state light sources and the interconnecting members from the shaking moulds to the tubular members. Filaments smaller in diameter than 3.3 mm enable the manufacturing of hundreds or even thousands of filaments in each batch or production cycle using shaking moulds. Filaments produced in this manner will inherently be cheap to produce due to the large quantity of filaments.

According to a fourth aspect of the invention, there is provided a method for manufacturing a lighting device, which method comprises providing a lighting device housing comprising a bulb portion and a base portion, the base portion being electrically connectable to the electrical grid. Arranging and connecting a filament manufactured according to the third aspect within the lighting device housing by means of a connecting structure which mechanically and electrically connects the filament to the base portion, and sealing the lighting device housing.

According to an embodiment, the method may comprise the step of filling the bulb portion of the lighting device housing with helium prior to sealing the lighting device housing.

Further features of, and advantages with, the present invention will become apparent when studying the appended claims and the following description. The skilled person realize that different features of the present invention may be combined to create embodiments other than those described in the following, without departing from the scope of the present invention. For example the light source may be a different light generator such as e.g. laser diodes, lasers, flash lamps, Xenon lamps or even X-ray sources. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an embodiment of the invention.

FIGS. 1A-1D are schematic side views of components of a filament;

FIG. 2 is a perspective view of a lighting device according to another embodiment of the invention;

FIGS. 4A-4C are schematic views of different embodiments of lighting assemblies according to embodiments of the invention;

FIG. 5 is a schematic side view of a lighting assembly; and

DETAILED DESCRIPTION OF THE DRAWINGS

Figure 3A:
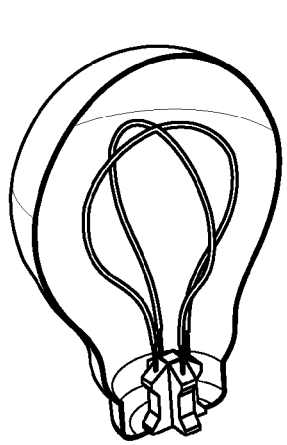
FIGS. 3A-3H are schematic views of different embodiments of filaments according to embodiments of the invention.
Figure 3D:
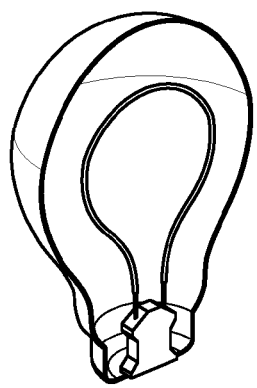
Figure 3B:
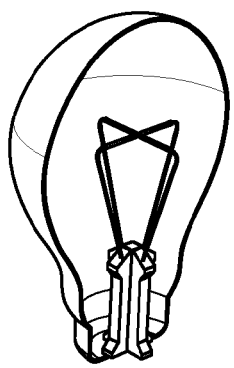
Figure 3E:
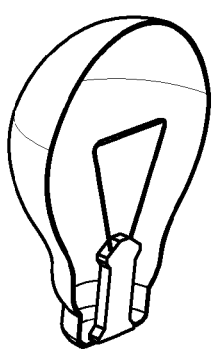
Figure 3G:
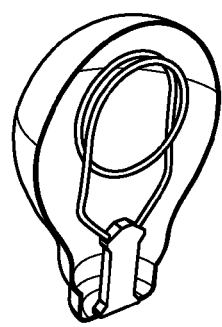
Figure 3C:
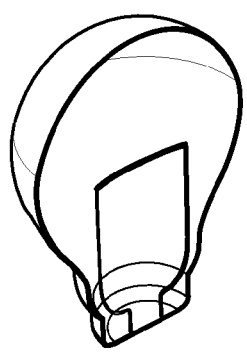
Figure 3F:
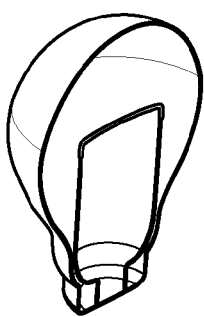
Figure 3H:
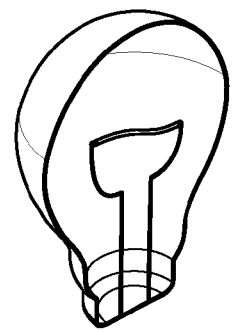

In the present detailed description, embodiments of a light emitting device according to the present invention are mainly discussed with reference to a filament comprising a plurality of LED light sources. It should be noted that this by no means limit the scope of the invention, which is also applicable in other circumstances, for example for use with other types of light sources. Moreover the amount of LEDs shown in the enclosed drawings is only a schematic representation. In use, the number, concentration and other such details will be decided by each application. In general, the number of LEDs per filament will be decided by the required length of the filament. LEDs should be broadly interpreted as LED dies, LED subassemblies, packaged LEDs or the like.

The invention will now be described with reference to the enclosed drawings where first attention will be drawn to the structure, and secondly functions of the filament and lighting device will be described.

FIG. 1A-1D show schematic side views of components of a filament 100. The lowermost view, i.e. FIG. 1D, shows the complete filament 100, while the other views show the filament 100 and the components during various stages of assembly. The filament 100 comprises light sources 102, which are commonly LEDs, including LED chip or dies, or another type of solid state light source. The light sources 102 are arranged in an alternating manner with the interconnecting elements 104, shown as pins 104 in FIG. 1A. The LEDs 102 and the pins 104 will form a light emitting assembly 106 which is electrically connected at each end by the connecting structures, in FIG. 1A-1D shown as wires 108. The light emitting assembly 106 will be arranged within a light transmissive tubular member 110, shown as a glass tube 110 in FIG. 1B. A wavelength converter 112 in the form of a layer of wavelength converting material 112 is arranged on the exterior surface outside of the glass tube 110 as shown in FIG. 1C. The layer 112 will advantageously be tuned to the types of LEDs 102 used for each filament 100. Note that the layer 112 may in some applications be arranged on the interior of the glass tube 110. The interior of the glass tube 110 may also be filled with silicone (not shown), which improves the extraction of light from the light sources to the glass tube 110. The silicone (not shown) can be in a liquid state or cured to a certain viscosity/flexibility to facilitate bending of the filament 100.

In use, electricity is provided to the light emitting assembly 106 through the wires 108, and the light sources 102 emit light towards the inside of the glass tube 110. The light will refract in the interface with the glass tube 110, and be guided through the glass tube 110 to the layer 112 and as a result of the refraction have a more uniform distribution being incident on the layer 112. The luminescent wavelength converting layer 112 will convert the light into a desired second wavelength or wavelength spectrum and thus, the aesthetic look and feel of an incandescent wire is provided by the filament 100. Note that it is a part of the total light emitted by the LEDs 102 which is converted, for example the blue light often emitted by high efficiency LEDs mixed with yellow light from the wavelength converter 112 will provide white light.

FIG. 2 is a perspective view of a lighting device 200 according to the present invention, therein embodied in the shape of a light bulb. The lighting device 200 comprises a bulb portion 202 and a base portion 204. Through the base portion 204, the lighting device 200 may be fitted to an ordinary lighting fixture for example an E14 or E27 Edison screw base for light bulbs. The base portion 204 is connected to driver electronics (not shown) of the lighting device if they are present, and is thereby able to connect the lighting device 200 to a power source such as the electric grid. The wires 108 mechanically and electrically connect the filament 100 and the base portion 204, and the filament is suspended in the bulb portion 202 by the wires 108. The base portion 204 of FIG. 2 is shaped as a screw base, however any shape or configuration whereby the lighting device 200 may be connected to a power source is within the scope of the invention such as a bayonet fixing with one or several plugs. The base portion 204 is covered, but there is ordinarily space within the base portion such that driver electronics, e.g. commonly voltage converters and/or AC/DC converters to convert the AC current of the electric grid to a voltage and frequency which suits the LEDs. The lighting device 200 in FIG. 2 further comprises sealing caps 210 arranged at each end of the filament 100. The sealing caps 210 are configured to reflect light, ensuring that no light which has not been converted by the wavelength converter escape from the filament and distort the desired wavelengths and thus colors emitted from the filament. Further, the sealing caps 210 are arranged to seal the inside of the filament 100 from the outside, in the embodiment shown in FIG. 2 the sealing caps 210 thus separate the environment within the filament 100 from the environment within the bulb portion 202. With the sealing caps 210, a wavelength converter, such as an organic phosphor compound, may be placed on the inside of the tube 110. The sealing caps 210 ensure that the organic phosphor compound is not exposed to the outside of the filament 100. The bulb portion 202 may also be filled with helium (not shown). Helium has a higher heat conductivity than air, therefore the heat produced, in use, by the filament will be dissipated more efficiently in the bulb portion. Helium is proposed due to the high heat conductivity, however due to price or other factors it may be suitable to use helium mixed with air or another gas that also has a relatively high heat conductivity.

Another wavelength converting material which is possible to use for the wavelength converter are quantum dots, which are small crystals of semiconducting material generally having a width or diameter of only a few nanometers. Such quantum dots may be incorporated in a matrix material such as a polymer (silicone, PMMA, PET) or ceramic/glass type of material. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as Indium phosphode (InP), and copper indium sulfide ($CuInS_2$) and/or Silver Indium Sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content. Organic phosphors are also usable for the wavelength converter 112. Organic phosphors may be molecularly dissolved/dispersed in a matrix material such as a polymer (e.g. silicone, PMMA, PET). Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Referring now to FIG. 3A-3H there are shown variations of a filament 100, and variations of arranging one or more filaments 100 within the bulb portion 202 of the lighting device. In no particular order of relevance note that the present invention allows for a curved or straight filament 100 in different arrangements, a looping filament 100 or straight filaments 100. Further, note that in embodiments shown in FIG. 3A and 3B there is a plurality of filaments 100. Having more than one filament 100 will naturally provide more light to be emitted and therefore a higher brightness provided by the lighting device 200. By curving a filament 100 within the bulb portion, the light emitted from the lighting device 200 may be directed to have a higher luminance in a predetermined direction. A curved appearance may also be seen as a more interesting design for a prospective customer. A uniform luminance may be achieved with both the curved filaments 100 and the straight filaments 100.

FIG. 4A-4C shows three variations of a light emitting assembly 106 with light sources 102 and interconnecting elements 104, therein shown as light emitting diode dies 102 and pieces of a lead frame 104. In the first assembly 401 shown in FIG. 4A, LED dies are arranged in pairs facing away from each other i.e. opposite each other on the pieces of lead frame 104. The first light emitting assembly 401 will be placed inside the first glass tube 402 on which a wavelength converter is arranged. The arrangement of LED dies facing away from each other will provide a high and even luminance. In the second assembly 403 shown in FIG. 4B, LED dies which are larger than the LED dies in the first assembly are arranged one by one on each side or opposite sides of the pieces of lead frame 104 in an alternating manner, i.e. the LED dies are arranged such that neighboring or adjacent LED dies emit light in substantially opposite directions. For example a first LED die emits light, in operation, upwards and a second LED die, which is the next or adjacent LED die arranged on the piece of lead frame 104, emits light downwards, in operation. Arranging LED dies on each side, or opposite sides, of the pieces of lead frame 104 in an alternating manner will still provide an even luminance, however as the pitch is longer the assembly 403 will require less energy to emit light from the LEDs 102. The second light emitting assembly 403 will be placed inside the second glass tube 404. In the third assembly 405 shown in FIG. 4C, larger LED dies are arranged in a similar manner as in the first assembly. The third light emitting assembly 405 will be placed inside the third glass tube 406. Note the increasing sizes of the glass tubes 402, 404, and 406. The first glass tube 402 has an outer diameter of 1.5 mm and an inner diameter of approximately 0.9 mm, the second glass tube has an outer diameter of 2.4 mm and the third glass tube has an outer diameter of 3.3 mm.

Now referring to FIG. 5, where a detailed view of a light emitting assembly 500 is shown. The light emitting assembly 500 comprises LEDs 102 arranged in an alternating manner with interconnecting elements in the form of solder balls 502. The solder balls 502 may be plated with e.g. silver or gold to increase the conductivity. The alternating manner shown in FIG. 5 comprises two solder balls 502 next to each other and then one LED 102. Having two or more solder balls 502 next to each other enables a larger distance between each LED 102 and thus a lower concentration of light sources. Hence, by configuring the arrangement regarding the number of solder balls 502 between each LED 102 the luminance and energy efficiency may be tuned.

Figure 6A:
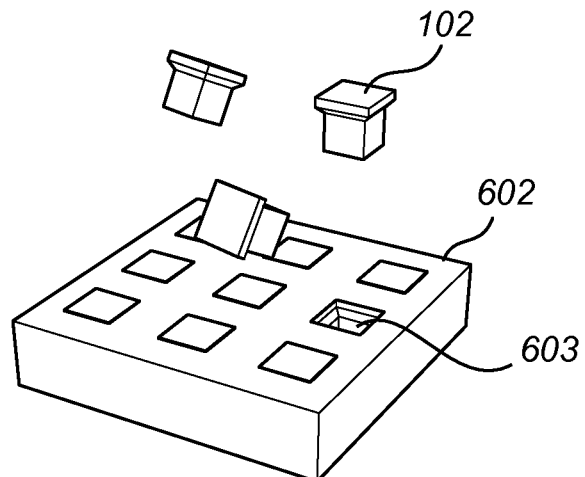
FIGS. 6A-6C is a schematic perspective view of a method for manufacturing a filament.
Figure 6B:
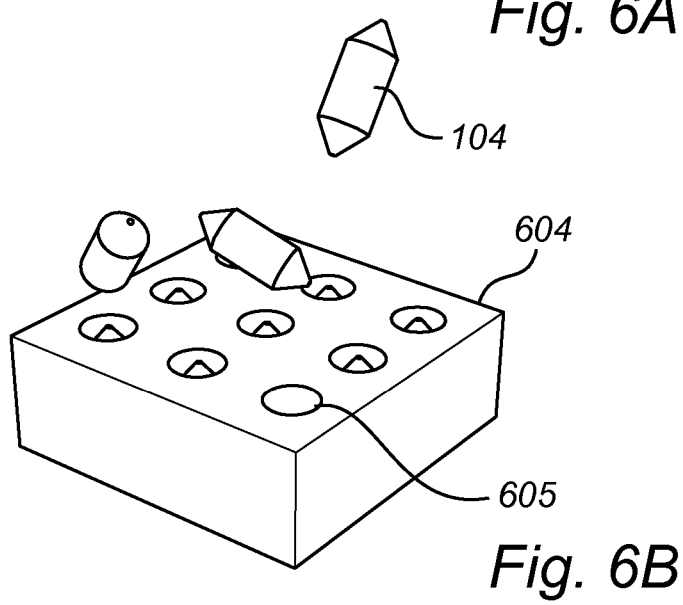
Figure 6C:
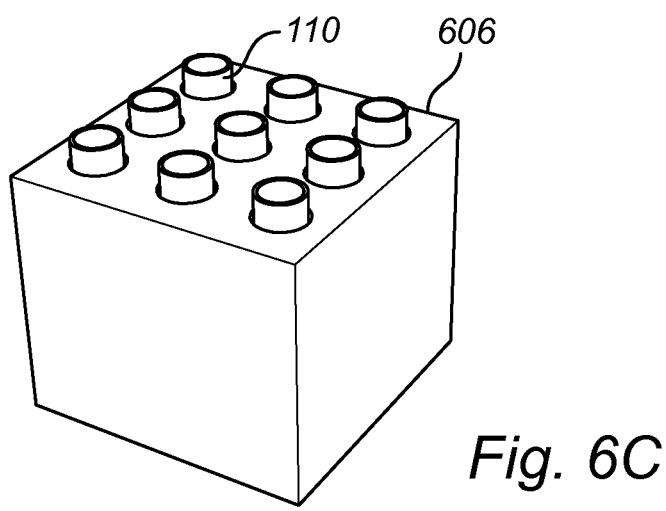

FIG. 6A-6C show a method of manufacturing using self-assembly through shaking moulds in a controlled environment. A first shaking mould 602 is shown in FIG. 6A, in this case for light sources 102 is provided which has through holes, pits, passages, or cavities 603 or similar shape centric features which correspond to a shape of the light source 102. Then, light sources 102 are provided to the first shaking mould 602 and an underpressure is applied at the bottom side of the mould 602. The first mould 602 is then shaken in order to force the light sources 102 to move around on the first mould 602 until the light sources 102 are positioned in such a manner that they, under the force of gravity and the applied under-pressure, slot into the holes 603 of the first mould 602. In this manner all the holes 603 will be filled with a light source 102 after a sufficient amount of time has passed. When all the holes 603 have been filled, the topside of the first mould 602 is either swept or rotated away to remove excess light sources 102. Then the first mould 602 is rotated away, if not already done so, and positioned above a matrix or mould 606 holding tubular members 110, which is shown in FIG. 6C. The holes 603 of the first mould 602 are aligned above the matrix 606 of tubular members 110 and the under-pressure is released, and alternatively also an overpressure applied, thereby transferring i.e. feeding the light sources 102 from each hole 603 into a corresponding tubular member 110 in the matrix 606. Then, a second shaking mould 604 which is shown in FIG. 6B, is provided in which pit, holes, passages, or cavities 605 or similar shaped features which correspond to the interconnecting elements 104 are provided. Then, interconnecting elements 104 are provided to the second shaking mould 604 and an under-pressure is applied at the bottom side of the mould 604. The second 604 mould is then shaken in order to allow the interconnecting elements 104 to slot into the holes under the force of gravity and the applied under-pressure. In this manner all the holes 605 will be filled with an interconnecting element 605 after a sufficient amount of time has passed. When all the holes 605 have been filled, the topside of the second mould 604 is either swept or rotated away to remove excess interconnecting element 605. Then the second mould 604 is rotated away, if not already done so, and positioned above the matrix or mould 606 holding tubular members 110. The holes 605 of the second mould 604 are aligned above the matrix 606 of tubular members 110 and the under-pressure is released, and alternatively also an over-pressure applied, thereby transferring the interconnecting elements 104 from each hole 605 into a corresponding tubular member 110 in the matrix 606. These two steps of providing a first mould for the light sources 602 and a second mould 604 for the interconnecting elements 104 are alternated and repeated to produce the light emitting assembly 106. The light emitting assembly 106 then comprises a plurality of alternating light sources 102 and interconnecting elements 104 which have been fed into the tubular members 110 being held in the matrix 606. Thus, it should be understood that the holes 603,605 of the first 602 and second mould 604 will align with the tubular members 110 arranged in the matrix 606. The tubular member 110 may be provided with the wavelength converter 112, or the wavelength converter 112 may be arranged on a surface after the light emitting assembly is placed inside the tubular member 110. By using the above described method for manufacturing a filament 100 using shaking moulds, a very large number of filaments 100 may be produced concurrently. As an example, using shaking moulds which are 150 mm long and 150 mm wide, tubular members having an outside diameter of 1.5 mm provides the possibility of manufacturing as many as 10,000 filaments per production cycle. Hence, providing inherently cheap filaments 100 which is economically beneficial to both during production and finally also to a customer.

In the case of a wavelength converter arranged on the inside of the tubular member 110, a first sealing cap 210 may be arranged at one end of the tubular member 110 and a second sealing cap 210 may be arranged at the opposite end of the tubular member. The sealing caps 210 seal the inside of the tubular member. The sealing caps 210 are thus fitted to the tubular member by a suitable fitting such as glue, threading or being securely pressed into the tubular member. The sealing caps 210 may be electrically conductive in order to connect the light emitting assembly 106 to the wires 108, otherwise they may be fitted around the wires 108. The sealing caps 210 will also reflect light emitted from the light sources 102 such that it passes through the wavelength converter 112 instead of escaping through the openings at the end of the filament.

Even though the invention has been described with reference to specific exemplifying embodiments thereof, many different alterations, modifications and the like will become apparent for those skilled in the art. For example the light source is preferably a solid state light emitter. Examples of solid state light emitters are Light Emitting Diodes (LEDs), Organic Light Emitting diode(s) OLEDs, or, for example, laser diodes. Solid state light emitters are used since they are relatively cost effect light sources and, in general, not expensive, have a relatively large efficiency and a long life-time. The solid state light source used is preferably a UV, Violet or Blue light source due to their high efficiency. Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination may not be used to an advantage.

The invention claimed is:

1. A filament for a lighting device, comprising:
   a light transmissive tubular member having an outer diameter of less than 3.3 mm;
   a light emitting assembly arranged within the tubular member; and
   a wavelength converter arranged at a surface of the tubular member, and configured to convert light from a first wavelength range to a second wavelength range,
   wherein the light emitting assembly comprises a plurality of solid state light sources and portions of a leadframe being arranged in an alternating manner to form a string of connected solid state light sources and portions of the leadframe, characterized in that at least a part of the plurality of solid state light sources are arranged on opposite sides of the lead frame in an alternating manner.

2. A filament according to claim 1, wherein said tubular member is formed from glass.

3. A filament according to claim 1, wherein said tubular member is formed from silicone.

4. A filament according to claim 1 wherein said tubular member is filled with silicone.

5. A filament according to claim 1, further comprising a first sealing cap arranged at one end of the tubular member and a second sealing cap arranged at the opposite end of the tubular member for sealing the inside of the tubular member, wherein the wavelength converter is arranged on the inside of the sealed light transmissive tubular member.

6. A filament according to claim 5, wherein the wavelength converter is organic phosphor.

7. A filament according to claim 1, wherein the solid state light sources are arranged on opposite sides of the lead frame in an alternating manner.

8. A filament according to claim 1, wherein the solid state light sources are light emitting diodes or light emitting diode dies.

9. A filament comprising:
   a light transmissive tubular member;
   a light emitting assembly arranged within the tubular member; and
   a wavelength converter arranged at a surface of the tubular member, and configured to convert light from a first wavelength range to a second wavelength range,
   wherein the light emitting assembly comprises a plurality of solid state light sources and portions of a leadframe being arranged in an alternating manner to form a string of connected solid state light sources and portions of the leadframe, characterized in that at least a part of the plurality of solid state light sources are arranged on opposite sides of the lead frame in an alternating manner,
   wherein the solid state light sources are arranged in pairs facing away from each other on the portions of the lead frame.

10. A lighting device comprising:
    a lighting device housing comprising a bulb portion and a base portion, the base portion being electrically connectable to the electrical grid; and
    a filament comprising:
    a light transmissive tubular member;
    a light emitting assembly arranged within the tubular member; and
    a wavelength converter arranged at a surface of the tubular member, and configured to convert light from a first wavelength range to a second wavelength range,
    wherein the light emitting assembly comprises a plurality of solid state light sources and portions of a leadframe being arranged in an alternating manner to form a string of connected solid state light sources and portions of the leadframe, characterized in that at least a part of the plurality of solid state light sources are arranged on opposite sides of the lead frame in an alternating manner,
    said filament electrically and mechanically connected to said base portion by a connecting structure within said bulb portion, wherein the lighting device housing is sealed.

11. A lighting device according to claim 10, wherein said bulb portion is filled with helium.

12. A method for manufacturing a filament, said method comprising the steps of:
    providing interconnecting elements and solid state light sources;
    arranging said interconnecting elements and solid state light sources in an alternating manner forming a string;
    placing said string inside a light transmissive tubular member; and
    arranging a wavelength converter at a surface of said tubular member, characterized in that said steps of providing interconnecting elements and solid state light sources and arranging said interconnecting elements and solid state light sources in an alternating manner forming a string, comprise: laser cutting a lead frame; applying tacky flux to said lead frame; arranging said solid state light sources on said lead frame, reflow soldering the lead frame and solid state light sources in order to fix the solid state light sources to said lead frame; and separating the lead frame from any support or adjacent lead frame(s).

13. A method for manufacturing a lighting device, which method comprises:
    providing a lighting device housing comprising a bulb portion and a base portion, the base portion being electrically connectable to the electrical grid;
    arranging and connecting a filament manufactured according to claim 12 within said bulb portion by means of a connecting structure; and
    sealing said lighting device housing.

14. A method for manufacturing a lighting device according to claim 13, further comprising the step of filling the lighting device housing with helium prior to sealing.

* * * * *